s009810039B2

United States Patent
Vick, Jr. et al.

(10) Patent No.: US 9,810,039 B2
(45) Date of Patent: Nov. 7, 2017

(54) VARIABLE DIAMETER PISTON ASSEMBLY FOR SAFETY VALVE

(71) Applicant: Halliburton Energy Services, Inc., Houston, TX (US)

(72) Inventors: James Dan Vick, Jr., Dallas, TX (US); Bruce Edward Scott, McKinney, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 220 days.

(21) Appl. No.: 14/396,546

(22) PCT Filed: Dec. 31, 2013

(86) PCT No.: PCT/US2013/078432
§ 371 (c)(1),
(2) Date: Oct. 23, 2014

(87) PCT Pub. No.: WO2015/102603
PCT Pub. Date: Jul. 9, 2015

(65) Prior Publication Data
US 2016/0273304 A1  Sep. 22, 2016

(51) Int. Cl.
*F16K 31/00* (2006.01)
*E21B 34/10* (2006.01)
(Continued)

(52) U.S. Cl.
CPC .......... *E21B 34/10* (2013.01); *F16K 1/2007* (2013.01); *F16K 31/1221* (2013.01); *E21B 2034/005* (2013.01)

(58) Field of Classification Search
CPC .. E21B 34/10; E21B 2304/005; F16K 1/2007; F16K 31/1221; F16K 31/1225
(Continued)

(56) References Cited

U.S. PATENT DOCUMENTS 3,713,485 A * 1/1973 Holbert, Jr. ............. E21B 34/02
                                                                 137/466
4,005,751 A * 2/1977 Page, Jr. ................ E21B 34/105
                                                                 166/321
(Continued)

FOREIGN PATENT DOCUMENTS

WO  2015102603 A1  7/2015
WO  2015102604 A1  7/2015

OTHER PUBLICATIONS

International Search Report and Written Opinion for PCT/US2013/078432 dated Sep. 29, 2014.

*Primary Examiner* — Umashankar Venkatesan
(74) *Attorney, Agent, or Firm* — McDermott Will & Emery LLP; Scott Richardson

(57) ABSTRACT

Disclosed are subsurface safety valves having a reduced spread between opening and closing pressures. One safety valve includes a housing having a piston bore defined therein and configured to receive hydraulic fluid pressure, the piston bore providing an upper bore having a first diameter, a lower bore having a second diameter, and an intermediate bore interposing the upper and lower bores and having a third diameter, wherein the third diameter is greater than the second diameter and the second diameter is greater than the first diameter, and a piston assembly movably arranged within the piston bore and comprising an upper piston operatively coupled to a lower piston, wherein the upper piston sealingly engages the upper bore and the lower piston sealingly engages the lower bore, wherein, when the upper piston is arranged in the intermediate bore, the hydraulic fluid pressure acts on the lower piston.

20 Claims, 5 Drawing Sheets

(51) Int. Cl.
*F16K 1/20* (2006.01)
*F16K 31/122* (2006.01)
*E21B 34/00* (2006.01)

(58) Field of Classification Search
USPC .......................................... 251/62, 229, 298
See application file for complete search history.

(56) References Cited

U.S. PATENT DOCUMENTS

| | | | |
|---|---|---|---|
| 4,161,219 A | 7/1979 | Pringle | |
| 4,234,043 A | 11/1980 | Roberts | |
| 4,252,197 A * | 2/1981 | Pringle | E21B 34/105 166/324 |
| 4,976,317 A * | 12/1990 | Leismer | E21B 34/101 166/321 |
| 4,986,357 A | 1/1991 | Pringle | |
| 5,251,702 A * | 10/1993 | Vazquez | E21B 34/107 166/324 |
| 5,284,205 A | 2/1994 | Smith | |
| 6,098,714 A * | 8/2000 | Deaton | E21B 34/10 166/321 |
| 7,055,607 B2 * | 6/2006 | Jacob | E21B 33/10 166/126 |
| 7,231,971 B2 * | 6/2007 | McCalvin | E21B 34/10 166/250.01 |
| 7,520,333 B2 * | 4/2009 | Turner | E21B 34/10 166/334.4 |
| 9,133,688 B2 * | 9/2015 | Jancha | E21B 34/10 |
| 2008/0128137 A1 | 6/2008 | Anderson et al. | |
| 2013/0092396 A1 * | 4/2013 | Webber | E21B 34/10 166/375 |
| 2015/0211333 A1 * | 7/2015 | Vick, Jr. | E21B 34/066 166/319 |
| 2015/0369005 A1 * | 12/2015 | Vick, Jr. | E21B 34/14 166/319 |

* cited by examiner

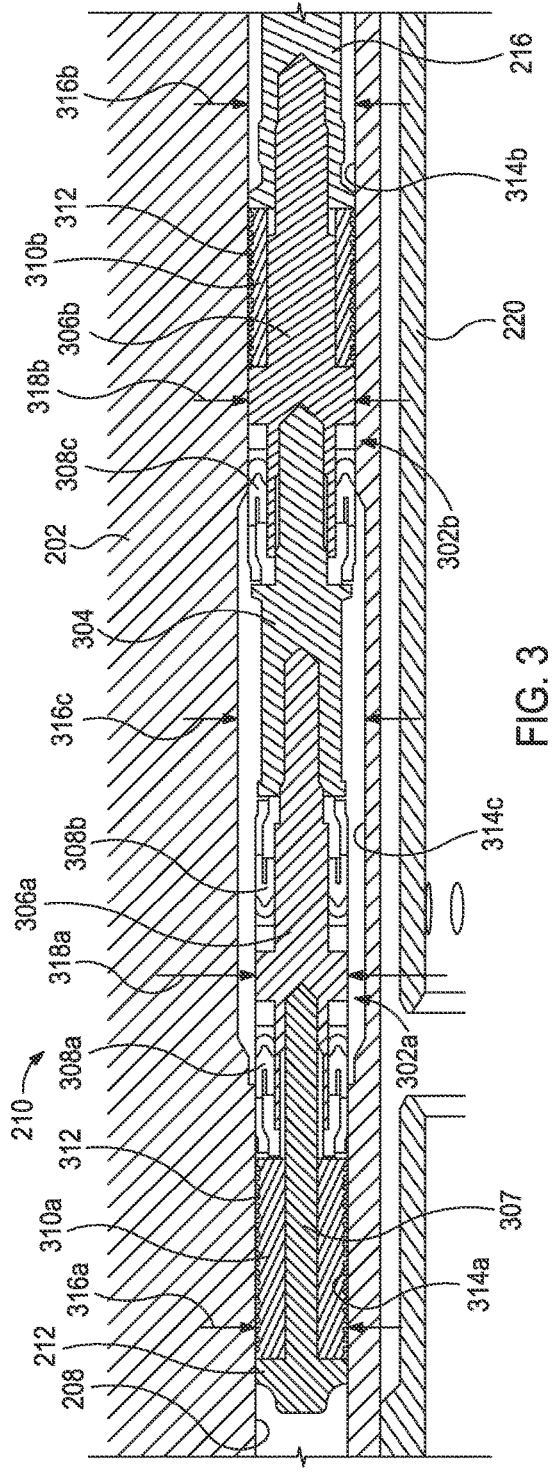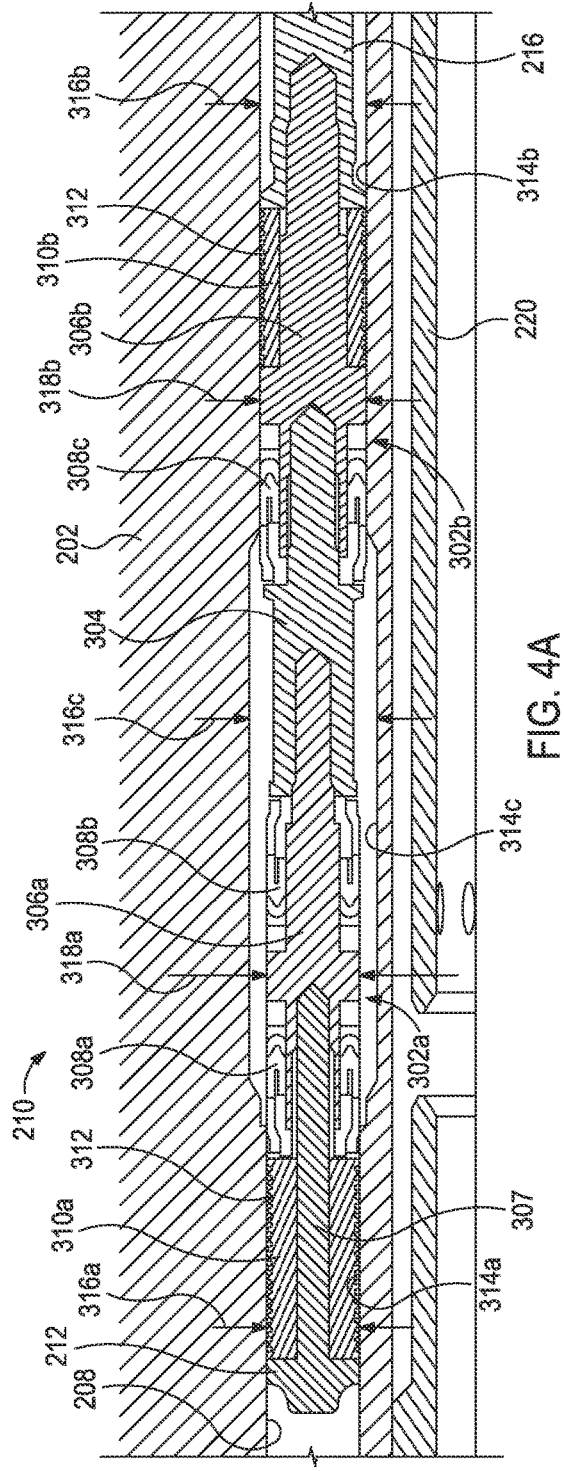

VARIABLE DIAMETER PISTON ASSEMBLY FOR SAFETY VALVE

BACKGROUND

The present disclosure relates generally to operations performed and equipment utilized in conjunction with subterranean wells and, in particular, to subsurface safety valves having a reduced spread between opening and closing pressures.

Subsurface safety valves are well known in the oil and gas industry and act as a failsafe to prevent the uncontrolled release of reservoir fluids in the event of a worst-case scenario surface disaster. Typical subsurface safety valves are flapper-type valves that are opened and closed with the help of a flow tube moving telescopically within the production tubular. The flow tube is often controlled hydraulically from the surface and is forced into its open position using a piston and rod assembly that may be hydraulically charged via a control line linked directly to a hydraulic manifold or control panel at the well surface. When sufficient hydraulic pressure is conveyed to the subsurface safety valve via the control line, the piston and rod assembly forces the flow tube downwards, which compresses a spring and simultaneously pushes the flapper downwards to the open position. When the hydraulic pressure is removed from the control line, the spring pushes the flow tube back up, which allows the flapper to move into its closed position.

As the setting depths of such hydraulically-actuated subsurface safety valves continues to increase, the energy required to move the safety valve against the hydrostatic head acting on the hydraulic actuator also increases. For example, on conventional safety valves, suitable biasing means, such as a gas chamber or more usually a power spring, act on the hydraulic actuator to overcome the hydrostatic force. However, there are practical limits to maximizing biasing forces such as springs, and minimizing the hydraulic areas of a hydraulic piston and cylinder assembly. Generally, to move a small hydraulic piston and cylinder assembly against a high hydrostatic head requires a strong spring that results in a high "spread" in the operating pressure to move the safety valve from a first position to a second position. Increasing the spread requires a change in surface operating pressures. Moreover, the springs used in subsurface safety valves require very high pounds of force and length and therefore become quite expensive. Lastly, increasing the length of the valve to reduce the spread can also be costly as it requires a longer spring.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 3 illustrates an enlarged cross-sectional side view of the piston assembly of FIGS. 2A and 2B, according to one or more embodiments.

FIGS. 4A and 4B illustrate progressive views of the piston assembly of FIG. 3 as it moves within a piston bore, according to embodiments of the present disclosure.

DETAILED DESCRIPTION

The present disclosure relates generally to operations performed and equipment utilized in conjunction with subterranean wells and, in particular, to subsurface safety valves having a reduced spread between opening and closing pressures.

Disclosed is a subsurface safety valve that reduces the spread between opening and closing pressures. The safety valve includes a piston assembly having first and second pistons arranged within a piston bore, where the second piston exhibits a larger piston area than the first piston. As a result, hydraulic pressure applied to the second piston may result in an increased force applied to the piston assembly and a reduction in the operating pressure spread. While the opening and closing pressure spread is typically controlled by the length of the power spring and limited by its practicality, the embodiments disclosed herein provide a safety valve that increases its setting depth and otherwise reduces its control pressure requirements. As a result, operators are able to reduce the size of surface operating pressure equipment and decreases the size and expense of the power spring.

Figure 1:
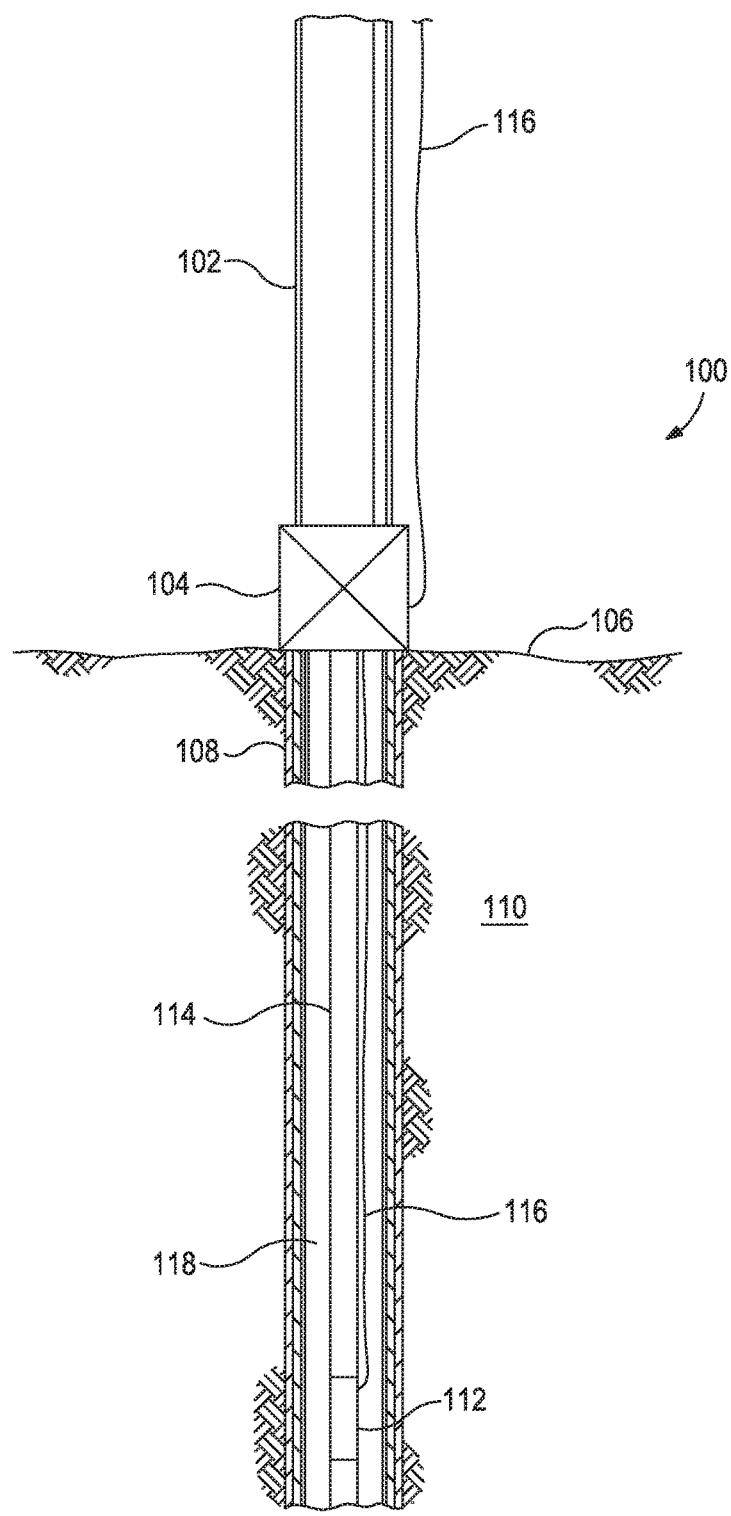
FIG. 1 is a well system that incorporates one or more embodiments of an exemplary safety valve, according to the present disclosure.

Referring to FIG. 1, illustrated is a well system 100 that incorporates one or more embodiments of an exemplary safety valve 112, according to the present disclosure. As illustrated, the well system 100 may include a riser 102 extending from a wellhead installation 104 arranged at a sea floor 106. The riser 102 may extend, for example, to an offshore oil and gas platform (not shown). A wellbore 108 extends downward from the wellhead installation 104 through various earth strata 110. The wellbore 108 is depicted as being cased, but it could equally be an uncased wellbore 108, without departing from the scope of the disclosure. Although FIG. 1 depicts the well system 100 in the context of an offshore oil and gas application, it will be appreciated by those skilled in the art that the various embodiments disclosed herein are equally well suited for use in or on other types of oil and gas rigs, such as land-based oil and gas rigs or rigs located at any other geographical site. Thus, it should be understood that the disclosure is not limited to any particular type of well.

The well system 100 may further include a safety valve 112 interconnected with a tubing string 114 arranged within the wellbore 108 and extending from the wellhead installation 104. The tubing string 114 may be configured to communicate fluids derived from the wellbore 108 and the surrounding subterranean formations to the well surface via the wellhead installation 104. A control line 116 may extend from the well surface and into the wellhead installation 104 which, in turn, conveys the control line 116 into an annulus 118 defined between the wellbore 108 and the tubing string 114. The control line 116 may extend downward within the annulus 118 and eventually become communicably coupled to the safety valve 112. As discussed in more detail below, the control line 116 may be configured to actuate the safety valve 112, for example, to maintain the safety valve 112 in an open position, or otherwise to close the safety valve 112 and thereby prevent a blowout in the event of an emergency.

In some embodiments, the control line 116 may be a hydraulic conduit that provides hydraulic fluid pressure to the safety valve 112. In operation, hydraulic fluid may be applied to the control line 116 from a hydraulic manifold (not shown) arranged at a remote location, such as at a production platform or a subsea control station. When properly applied, the hydraulic pressure derived from the control line 116 may be configured to open and maintain the safety valve 112 in its open position, thereby allowing production fluids to flow through the tubing string. To move the safety valve 112 from its open position and into a closed position, the hydraulic pressure in the control line 116 may be reduced or otherwise eliminated.

Although the control line 116 is depicted in FIG. 1 as being arranged external to the tubing string 114, it will be readily appreciated by those skilled in the art that any hydraulic line may be used to convey actuation pressure to the safety valve 112. For example, the hydraulic line could be internal to the tubing string 114, or otherwise formed in a sidewall of the tubing string 114. The hydraulic line could extend from a remote location, such as from the earth's surface, or another location in the wellbore 108. In yet other embodiments, the actuation pressure could be generated by a pump or other pressure generation device communicably coupled to the safety valve 112 via the control line 116.

In the following description of the representative embodiments of the disclosure, directional terms such as "above", "below", "upper", "lower", etc., are used for convenience in referring to the accompanying drawings. In general, "above", "upper", "upward" and similar terms refer to a direction toward the earth's surface along the wellbore 108, and "below", "lower", "downward" and similar terms refer to a direction away from the earth's surface along the wellbore 108.

Figure 2A:
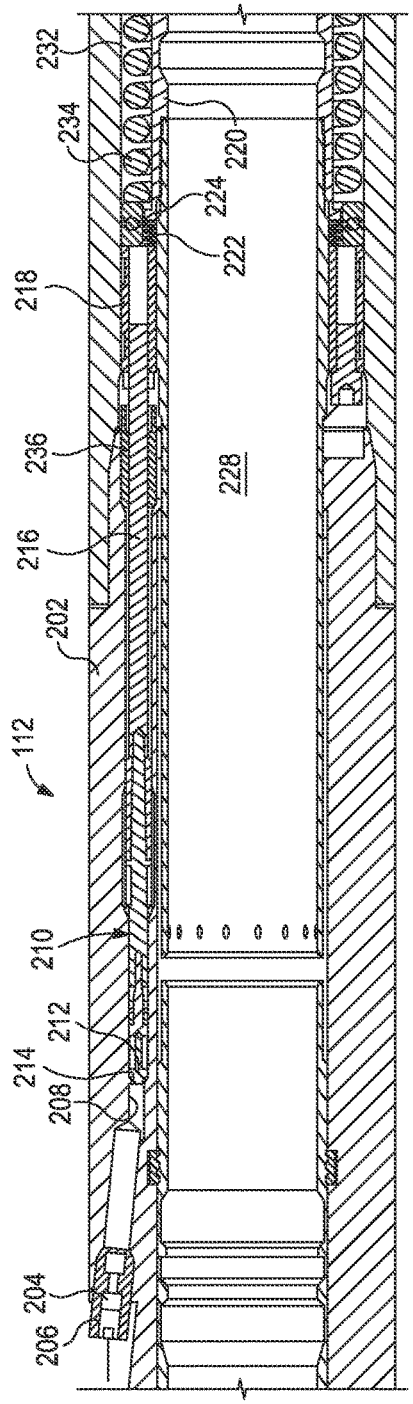
FIGS. 2A and 2B illustrate cross-sectional side views of the exemplary safety valve of FIG. 1, according to one or more embodiments.
Figure 2B:
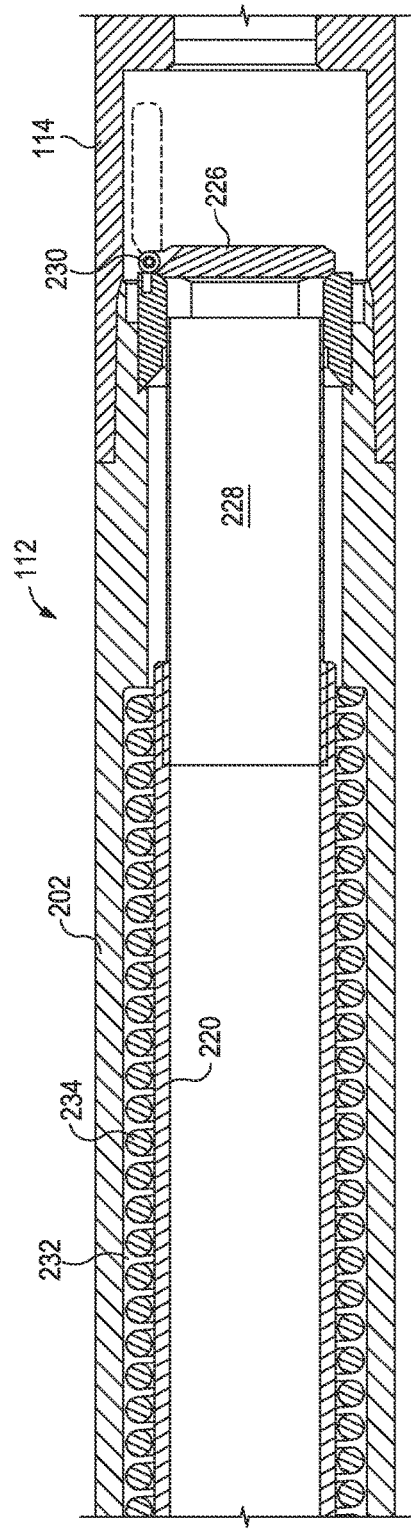

Referring now to FIGS. 2A and 2B, with continued reference to FIG. 1, illustrated are cross-sectional side views of an exemplary embodiment of the safety valve 112, according to one or more embodiments. In particular, the safety valve 112 is depicted in FIGS. 2A and 2B in successive sectional views, where FIG. 2A depicts an upper portion of the safety valve 112 and FIG. 2B depicts a lower portion of the safety valve 112. As illustrated, the safety valve 112 may include a housing 202 that is able to be coupled to the tubing string 114 at opposing ends of the housing 202 (tubing string 114 shown only in FIG. 2B).

A control line port 204 may be defined or otherwise provided in the housing 202 for connecting the control line 116 (FIG. 1) to the safety valve 112. The port 204 is shown in FIG. 2A as being plugged with a set screw 206 or other type of plugging device. When the control line 116 is appropriately connected to the first port 204, however, the control line 116 is placed in fluid communication with a piston bore 208 and able to convey hydraulic fluid pressure thereto. The piston bore 208 may be an elongate channel or conduit defined within the housing 202 and configured to extend longitudinally along a portion of the axial length of the safety valve 112.

A piston assembly 210 may be arranged within the piston bore 208 and configured to translate axially therein. A more detailed discussion of the piston assembly 210 is provided below. Briefly, however, the piston assembly 210 may include a piston head 212 configured to mate with and otherwise bias an up stop 214 defined within the piston bore 208 when the piston assembly 210 is forced upwards in the direction of the control line port 204. The up stop 214 may be a radial shoulder defined by the housing 202 within the piston bore 208 and having a reduced diameter and an axial surface configured to engage a corresponding axial surface of the piston head 212. In other embodiments, the up stop 214 may be any device or means arranged within the piston bore 208 that is configured to stop the axial movement of the piston assembly 210 as it advances toward the control line port 204.

The piston assembly 210 may also include a piston rod 216 that extends longitudinally from the piston assembly 210 through at least a portion of the piston bore 208. At a distal end thereof, the piston rod 216 may be coupled to an actuator sleeve 218, which may be configured to effectively couple the piston assembly 210 to a flow tube 220 that is movably arranged within the safety valve 112. More particularly, the actuator sleeve 218 may engage a biasing device 222 (e.g., a compression spring, a series of Belleville washers, or the like) arranged axially between the actuator sleeve 218 and an actuation flange 224 that forms part of the proximal end of the flow tube 220. As the actuator sleeve 218 acts on the biasing device 222 (e.g., axial force), the actuation flange 224 and the flow tube 220 correspondingly move.

Referring to FIG. 2B, the safety valve 112 may also include a valve closure device 226 that selectively opens and closes a flow passage 228 defined through the interior of the safety valve 112. The valve closure device 226 may be a flapper, as generally known to those skilled in the art. It should be noted, however, that although the safety valve 112 is depicted as being a flapper-type safety valve, those skilled in the art will readily appreciate that any type of closure device 226 may be employed, without departing from the scope of the disclosure. For example, in some embodiments, the closure device 226 could instead be a ball, a sleeve, etc.

As shown in FIG. 2B, the closure device 226 is shown in its closed position whereby the closure device 226 is able to substantially block fluid flow into and through the flow passage 228 from downhole. A torsion spring 230 biases the closure device 226 to pivot to its closed position. As described below, the flow tube 220 is able to displace downward (i.e., to the right in FIG. 2B) to engage the closure device 226 and overcome the spring force of the torsion spring 230. When the flow tube 220 is extended to its downward position, it engages the closure device 226 and moves the closure device 226 from its closed position to an open position (shown in phantom as dashed lines). When the flow tube 220 is displaced back upward (i.e., to the left in FIG. 2B), the torsion spring 230 is able to pivot the closure device 226 back to its closed position. Axial movement of the piston assembly 210 within the piston bore 208 will force the flow tube 220 to correspondingly move axially within the flow passage 228, and either open the closure device 226 or allow it to close, depending on its relative position.

The safety valve 112 may further define a lower chamber 232 within the housing 202. In some embodiments, the lower chamber 232 may form part of the piston bore 208, such as being an elongate extension thereof. A power spring 234, such as a coil or compression spring, may be arranged within the lower chamber 232. The power spring 234 may be configured to bias the actuation flange 224 and actuation sleeve 218 upwardly which, in turn, biases the piston assembly 210 in the same direction. Accordingly, expansion of the power spring 234 will cause the piston assembly 210 to move upwardly within the piston bore 208.

It should be noted that while the power spring 234 is depicted as a coiled compression spring, any type of biasing device may be used instead of, or in addition to, the power spring 234, without departing from the scope of the disclosure. For example, a compressed gas, such as nitrogen, with appropriate seals may be used in place of the power spring 234. In other embodiments, the compressed gas may be contained in a separate chamber and tapped when needed.

In exemplary operation, the safety valve 112 may be actuated in order to open the closure device 226. This may be accomplished by conveying a hydraulic fluid under pressure to the control line port 204 via the control line 116. As hydraulic pressure is provided to the piston bore 208, the piston assembly 210 may be forced to move axially downward within the piston bore 208. As the piston assembly 210 moves, the piston rod 216 mechanically transfers the hydraulic force to the actuation sleeve 218 and the actuation flange 224, thereby correspondingly displacing the flow tube 220 in the downward direction. In other words, as the piston assembly 210 moves axially within the piston bore 208, the flow tube correspondingly moves in the same direction. As the flow tube 220 moves downward, it engages the closure device 226, overcomes the spring force of the torsion spring 230, and thereby pivots the closure device 226 to its open position to permit fluids to enter the flow passage 228 from below.

Moreover, as the piston assembly 210 moves axially downward within the piston bore 208, the power spring 234 is compressed within the lower chamber 232 and progressively builds spring force. In at least one embodiment, the piston assembly 210 will continue its axial movement in the downward direction, and thereby continue to compress the power spring 234, until engaging a down stop 236 (FIG. 2A) arranged within the piston bore 208. As described below, a metal-to-metal seal may be created between the piston assembly 210 and the down stop 236 such that the migration of fluids (e.g., hydraulic fluids, production fluids, etc.) therethrough is generally prevented.

Upon reducing or eliminating the hydraulic pressure provided via the control line 116, the spring force built up in the power spring 234 may be allowed to release and displace the piston assembly 210 upwards within the piston bore 208, thereby correspondingly moving the flow tube 220 in the same direction. As the flow tube 220 moves axially upwards, it will eventually move out of engagement with the closure device 226. Once free from engagement with the flow tube 220, the spring force of the torsion spring 230 will pivot the closure device 226 back into its closed position.

In at least one embodiment, the piston assembly 210 will continue its axial movement in the upward direction until the piston head 212 of the piston assembly 210 engages the up stop 214 and effectively prevents the piston assembly 210 from further upward movement. Engagement between the piston head 212 and the up stop 214 may generate a mechanical metal-to-metal seal between the two components to prevent the migration of fluids (e.g., hydraulic fluids, production fluids, etc.) therethrough.

In conventional or traditional safety valves, the full open pressure for the safety valve is usually much higher than its closing pressure. This is primarily due to the force of the power spring acting on a fixed diameter piston assembly. For example, when the safety valve is closed, the power spring is extended and therefore at its weakest, but when the safety valve is open, the spring is contracted and therefore at its strongest. Those skilled in the art will readily appreciate the advantages of having a safety valve that allows the forces required to open and close the safety valve to be relatively close. For instance, the hydrostatic head acting on the control line is a function of the depth of the safety valve within the wellbore and, as a result, safety valves that have opening and closing pressures close to each other are able to be set deeper within a well.

According to embodiments of the present disclosure, the piston assembly 210 and the piston bore 208 may exhibit varying diameters in order to provide a safety valve 112 where the pressures required to open and close the safety valve 112 are closer than in conventional safety valves. The varying diameters of the piston assembly 210 and the piston bore 208 result in the area of the piston assembly 210 multiplied by the force of the power spring 234 while closing the safety valve 112 being equal to or substantially equal to the area of the piston assembly 210 multiplied by the force of the power spring 234 while opening the safety valve 112. As a result, the safety valve 112 may be set deeper within the wellbore 108 (FIG. 1) and the hydraulic equipment (not shown) used to pressurize the control line 116 (FIG. 1) can be smaller and therefore less expensive.

Referring now to FIG. 3, with continued reference to FIGS. 2A and 2B, illustrated is an enlarged cross-sectional side view of the exemplary piston assembly 210, according to one or more embodiments. As illustrated, the piston assembly 210 may include a first or upper piston 302a and a second or lower piston 302b. The upper and lower pistons 302a,b may be axially offset from each other within the piston bore 208 and coupled together using a spacer member 304 such that they are able to move as one as the piston assembly 210 moves within the piston bore 208.

The upper piston 302a may include a body 306a, and the piston head 212 may be coupled or otherwise attached to the body 306a. In the illustrated embodiment, the piston head 212 may include a stem 307 that extends longitudinally to couple the piston head 212 to the body 306a. In some embodiments, the stem 307 may be threaded to the body 306a. In other embodiments, however, the stem 307 may be attached to the body 306a using one or more mechanical fasteners or the like, without departing from the scope of the disclosure.

The upper piston 302a may also include a first or upper dynamic seal 308a and a second or lower dynamic seal 308b. The first and second dynamic seals 308a,b may be axially offset from each other along the axial length of the body 306a and arranged radially thereabout. The first and second dynamic seals 308a,b may be configured to "dynamically" seal against portions of the inner wall of the piston bore 208 as the piston assembly 210 moves axially within the piston bore 208, thereby preventing any fluids from migrating past the upper piston 302a. In some embodiments, one or both of the first and second dynamic seals 308a,b may be O-rings or the like. In other embodiments, one or both of the first and second dynamic seals 308a,b may be v-rings or other types of dynamic seals, as known to those skilled in the art, such as commercially-available VERISEAL® sealing rings. While the upper piston 302a is shown as having first and second dynamic seals 308a,b, those skilled in the art will readily appreciate that the upper piston 302a may employ only a single dynamic seal, or more than two dynamic seals, without departing from the scope of the disclosure.

The upper piston 302a may further include an upper labyrinth seal 310a arranged radially about the stem 307 of the piston head 212 and generally interposing the piston head 212 and the first dynamic seal 308a. In other words, the upper labyrinth seal 310a may be arranged axially above the body 306a and the first and second dynamic seals 308a,b. As illustrated, the upper labyrinth seal 310a may include a plurality of grooves, pores, or teeth 312 (hereafter "teeth 312") configured to extend into close engagement with the inner wall of the piston bore 208. The teeth 312 may provide a tortuous flow path configured to slow the flow of fluids migrating axially across the upper labyrinth seal 310a.

Similar to the upper piston 302a, the lower piston 302b may include a body 306b, and the piston rod 216 may be coupled or otherwise attached to the body 306b and extend longitudinally therefrom within the piston bore 208. The spacer member 304 may threadably or mechanically attach the two bodies 306a,b together such that simultaneous movement of each piston 302a,b is achieved when the piston assembly 210 axially translates within the piston bore 208. Similar to the upper piston 302a, the lower piston 302b may likewise include a dynamic seal 308c, referred to herein as a third dynamic seal 308c. Similar to the first and second dynamic seals 308a,b, the third dynamic seal 308c may also include or otherwise encompass a plurality of seals that "dynamically" seal against portions of the inner wall of the piston bore 208 as the piston assembly 210 moves axially therein. The third dynamic seal 308c may operate to prevent fluids from migrating past the lower piston 302b. While the lower piston 302b is shown as having the third dynamic seal 308c, those skilled in the art will readily appreciate that the lower piston 302b may employ more than one dynamic seal, without departing from the scope of the disclosure.

The lower piston 302b may further include a lower labyrinth seal 310b arranged radially about the body 306b and generally interposing the body 306b and the piston rod 216. Similar to the upper labyrinth seal 310a, the lower labyrinth seal 310b may include a plurality of grooves or teeth 312 configured to extend into close engagement with the inner wall of the piston bore 208 and thereby provide a tortuous flow path configured to slow the flow of fluids from migrating axially across the lower labyrinth seal 310b.

In the illustrated embodiment, the piston bore 208 may be divided into an upper bore 314a, a lower bore 314b, and an intermediate bore 314c that interposes and provides a transition between the upper and lower bores 314a,b. The upper bore 314a may exhibit a first diameter 316a, the lower bore 314b may exhibit a second diameter 316b, and the intermediate bore 314c may exhibit a third diameter 316c. As illustrated, the first diameter 316a is smaller than the second diameter 316b, and the second diameter 316b is smaller than the third diameter 316c. The upper piston 302a may exhibit a diameter 318a substantially similar to, but slightly less than, the first diameter 316a, and the lower piston 302b may exhibit a diameter 318b substantially similar to, but slightly less than the second diameter 316b. As a result, the upper piston 302a, including the first and second dynamic seals 308a,b and the upper labyrinth seal 310a, may be configured to sealingly engage the inner walls of the upper bore 314a, and the lower piston 302b, including the third dynamic seal 308c and the lower labyrinth seal 310b, may be configured to sealingly engage the inner walls of the lower bore 314b.

Since the diameter 318b of the lower piston 302b is greater than the diameter 318a of the upper piston 302a, the lower piston 302b exhibits a larger piston area than that of the upper piston 302a. As a result, hydraulic pressure applied on the lower piston 302b will result in a larger force being applied on the piston assembly 210 as opposed to the same hydraulic pressure being applied on the upper piston 302b. As described in greater detail below, this may prove advantageous in minimizing or eliminating altogether the spread between the opening and closing pressures for the safety valve 112 (FIGS. 2A-2B) as the piston assembly 210 moves within the piston bore 208.

Figure 4B:
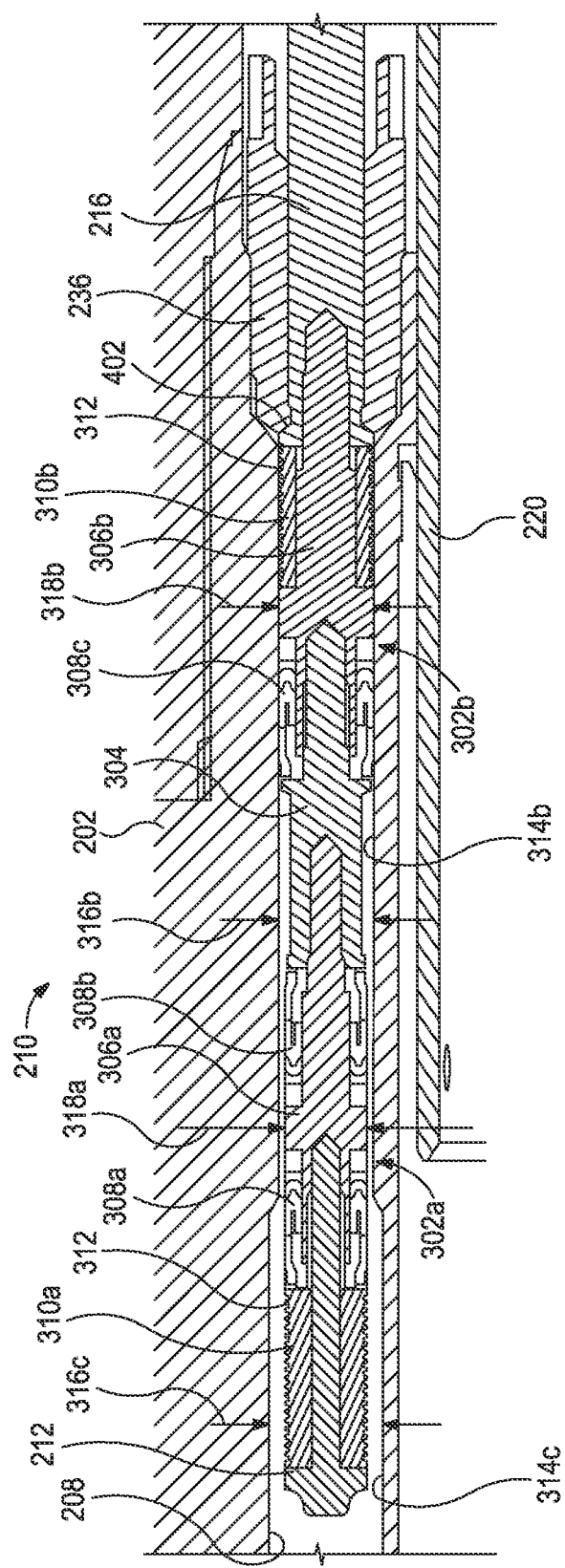

Referring now additionally to FIGS. 4A and 4B, with continued reference to FIG. 3, exemplary operation of the piston assembly 210 is now provided, according to one or more embodiments. Following the view provided in FIG. 3, FIGS. 4A and 4B depict progressive views of the piston assembly 210 as it moves within the piston bore 208, according to embodiments of the present disclosure. In FIG. 3, hydraulic pressure has been introduced into the piston bore 208 via the control line 116 (FIG. 1) and associated port 204 (FIG. 2A), as generally described above, and has caused the piston assembly 210 to advance such that the first and second dynamic seals 308a,b have exited the upper bore 314a into the intermediate bore 314c. More particularly, the hydraulic fluid acts on the upper piston 302a, which sealingly engages the inner wall of the upper bore 314a via the first and second dynamic seals 308a,b, and thereby hydraulically forces the upper piston 302a to translate axially in the downward direction (i.e., to the right in FIG. 3).

As the first and second dynamic seals 308a,b begin to exit the upper bore 314a, the upper labyrinth seal 310a continues to open the safety valve 112 (FIGS. 2A and 2B) as the pressure within the control line 116 (FIG. 1) and the piston bore 208 increases. Once the first and second dynamic seals 308a,b exit the upper bore 314a some hydraulic fluid is able to migrate past the upper piston 302a and into the intermediate bore 314c via the "leaky" upper labyrinth seal 310a. While not providing a fluid seal to the level of the first and second dynamic seals 308a,b, the upper labyrinth seal 310a nonetheless significantly reduces the amount of fluid that is able to migrate past the upper piston 302a. As a result, the upper labyrinth seal 310a may also serve to prevent the first and second dynamic seals 308a,b from being "blown" off or otherwise damaged from the influx of high-pressure hydraulic fluid. The hydraulic fluid may enter and fill the intermediate bore 314c, thereby being able to act on the lower piston 302b.

Referring now to FIG. 4A, as the second dynamic seal 308b fully emerges from the upper piston bore 314a, the piston assembly 210 may be configured or otherwise designed such that the third dynamic seal 308c enters the lower bore 314b, and thereby forms a fluid seal against the inner wall thereof. In some embodiments, the axial lengths of the upper, intermediate, and lower bores 314a-c may ensure that this is possible, as described in greater detail below. In other embodiments, the axial length of the spacer member 304 may help ensure that the third dynamic seal 308c enters the lower bore 314b at about the same time the second dynamic seal 308b fully emerges from the upper piston bore 314a. In yet other embodiments, the third dynamic seal 308c may enter the lower bore 314b before the second dynamic seal 308b fully emerges from the upper piston bore 314a or after the second dynamic seal 308b fully emerges from the upper piston bore 314a, without departing from the scope of the disclosure. In any event, as the second dynamic seal 308b fully emerges from the upper piston bore 314a, the hydraulic force applied to the piston bore 208 may be transferred from the upper piston 302a to the lower piston 302b which, as mentioned above, exhibits a larger piston area than the upper piston 302a. The combination of the upper labyrinth seal 310a and the lower piston 302b may ensure a gradual transition from the first and second dynamic seals 308a,b to the third dynamic seal 308c.

As depicted in FIG. 4B, the piston assembly 210 has advanced within the piston bore 208 such that both the upper and lower pistons 302a,b have entered the lower bore 314b. Since the diameter 318a of the upper piston 302a is less than the diameter 316c of the lower bore 314b, the power spring 234 (FIGS. 2A-2B) at this point is acting only on the lower piston 302b. As a result, the hydraulic force applied to the piston bore 208 via the control line 116 (FIG. 1) is acting only on the lower piston 302b, which exhibits a diameter 318b configured to sealingly engage the inner walls of the lower bore 314b.

The piston assembly 210 may continue to advance within the piston bore 208 until engaging the down stop 236. More specifically, a radial shoulder 402 defined on the piston assembly 210 (e.g., on the piston rod 216) may engage the down stop 236 and prevent any continued axial movement of the piston assembly 210 in the downward direction. Moreover, engagement of the radial shoulder 402 with the down stop 236 may result in a metal-to-metal seal generated between the two components such that the migration of fluids (e.g., hydraulic fluids, production fluids, etc.) therethrough is generally prevented at that location.

Because the lower piston 302b has a larger diameter 318b and therefore exhibits a larger piston area than the upper piston 302a, the operating pressure "spread" for the safety valve 112 (FIGS. 2A-2B) may be minimized and/or potentially eliminated. That is, the opening pressure above the piston assembly 210 may be the same as or even less than the closing pressure above the piston assembly 210 according to the disclosed embodiments. While the force of the power spring 234 (FIGS. 2A-2B) increases against the piston assembly 210 as the safety valve 112 (FIGS. 2A-2B) moves from the closed to the open position, the piston area on which the hydraulic fluid within the piston bore 208 is able to act upon also increases as the lower piston 302b moves into the lower bore 314b and thereby assumes the hydraulic pressure force. With a larger piston area being acted upon, less hydraulic pressure via the control line 116 (FIG. 1) is needed to move the piston assembly 210 toward the end of its stroke. Accordingly, once hydraulic fluid begins acting on the lower piston 302b, additional pressure via the control line 116 is not required to continue movement to the open position, since an increased opening hydraulic force is provided with the same pressure as a result of the increased pressure area of the lower piston 302b being acted upon.

Once the hydraulic pressure provided to the piston bore 208 is reduced, the spring force built up in the power spring 234 and any hydraulic pressure below the piston assembly 210 may serve to displace the piston assembly 210 back upwards within the piston bore 208 (e.g., to the left in FIGS. 3, 4A, and 4B). As the third dynamic seal 308c exits the lower bore 314b in the upward direction and the first and second dynamic seals 308a,b begin to reenter the upper bore 314a, the lower labyrinth seal 310b may help transition any fluid pressure applied to the lower piston 302b back to the upper piston 302a without risking blowing off the third dynamic seal 308c. The combination of the lower labyrinth seal 310b and the upper piston 302a ensure a gradual transition from the third dynamic seal 308c back to the first and second dynamic seals 308a,b within the upper bore 314a. As the power spring 234 expands, its spring force correspondingly decreases. However, the piston area of the upper piston 302a is smaller than that of the lower piston 302b, thereby providing less hydrostatic head force acting against the power spring 234, and thereby also allowing closure of the safety valve 112 (FIGS. 2A-2B) to be made at a pressure that is closer to the pressure required for opening.

Figure 5A:
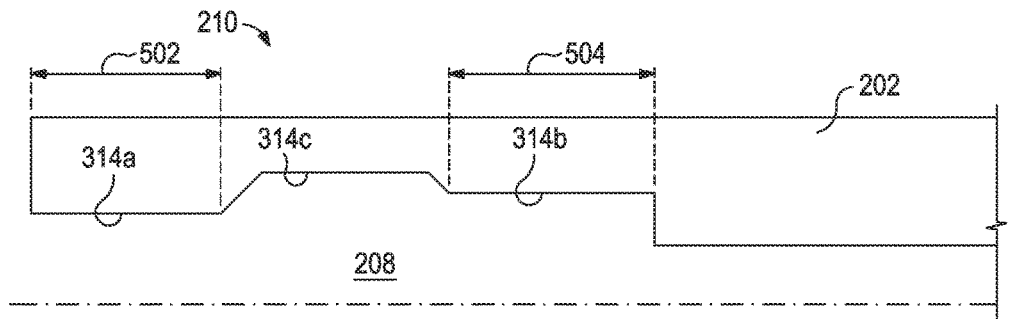
FIGS. 5A-5C illustrate exemplary modifications to the piston assembly of FIG. 3, according to one or more embodiments.
Figure 5B:
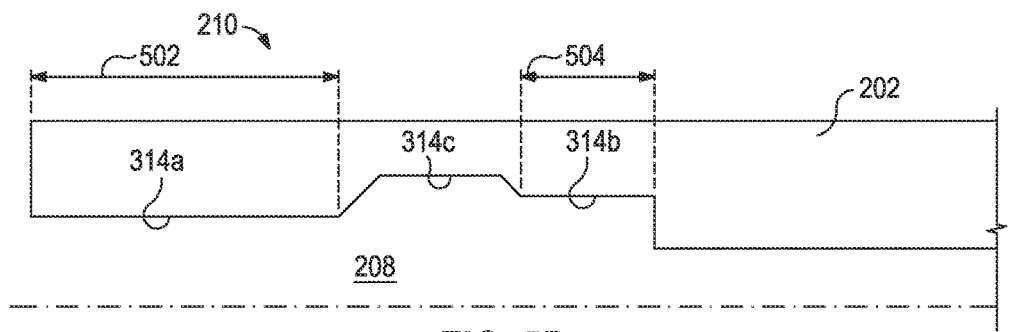
Figure 5C:
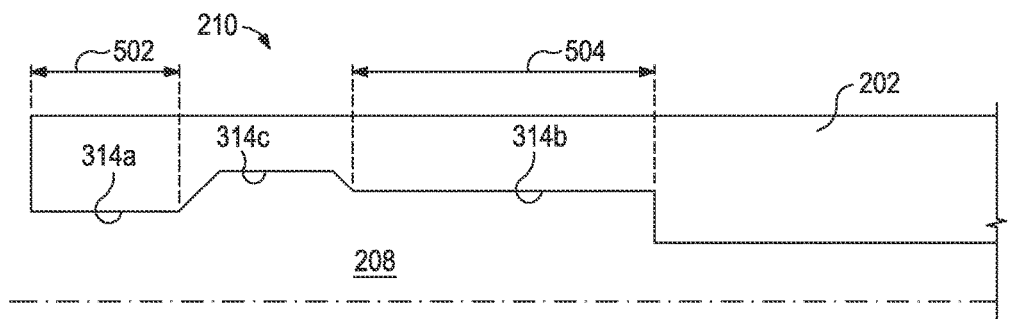

Referring now to FIGS. 5A-5C, with continued reference to the prior figures, illustrated are schematic diagrams of exemplary modifications to the piston assembly 210, according to one or more embodiments. Specifically, FIGS. 5A-5C depict a portion of the housing 202 and the piston bore 208 of the safety valve 112 (FIGS. 2A-2B). In FIGS. 5A-5C, the piston bore 208 is divided into the upper bore 314a, the intermediate bore 314c, and the lower bore 314b, as generally described above. As illustrated, the upper bore 314a exhibits a first length 502 and the lower bore 314b exhibits a second length 504. According to the present disclosure, the operating pressure spread between opening and closing the safety valve 112 (FIGS. 2A-2B) may be manipulated or otherwise optimized by varying the first and second lengths 502, 504. By doing so, an operator may be able to have an increased hydraulic force of the lower piston 302b (i.e., larger piston area) at a predetermined point or location in the stroke of the piston assembly 210. Alternatively, varying the first and second lengths 502, 504 may prove advantageous in dropping the required closing pressure soon after the safety valve 112 begins to close.

In FIG. 5A, the first and second lengths 502, 504 may be substantially the same. Such an embodiment may prove useful where the length of the piston assembly 210 determines when the hydraulic pressure within the piston bore 208 acts on the upper or lower pistons 302a,b. As a result, the first and second lengths 502, 504 of the upper and lower bores 314a,b, respectively, may be negligible or unimportant.

In FIG. 5B, the first length 502 is longer than the second length 504. Such an embodiment may prove useful where an operator desires to have a high opening force during most of the opening of the safety valve 112 (FIGS. 2A-2B), but then the opening force drops near the end of the stroke when the lower piston 302b enters the lower bore 314b. Such an embodiment may also prove advantageous in requiring a high closing force only during the initial closing movement of the safety valve 112 (FIGS. 2A-2B), where the required closing force rapidly drops off as the lower piston 302b emerges from the lower bore 314b and the upper piston moves quickly from the lower bore 314b to the upper bore 314a.

In FIG. 5C, the first length 502 is shorter than the second length 504. Such an embodiment may prove useful where an operator desires to have an initial high opening force that quickly transitions into a low opening force for the majority of the opening stroke when the lower piston 302b enters the lower bore 314b. Such an embodiment may also prove advantageous in requiring a high closing force during most of the closing stroke, but the required closing force drops off as the lower piston 302b emerges from the lower bore 314b and the upper piston moves into the upper bore 314a.

Figure 6:
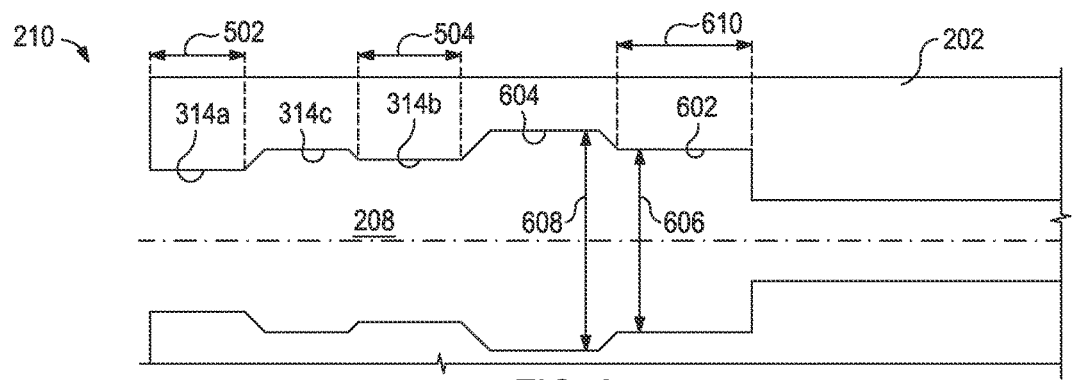
FIG. 6 illustrates another exemplary modification to the piston assembly of FIG. 3, according to one or more embodiments.

Referring now to FIG. 6, with continued reference to the prior figures, illustrated is another schematic diagram of an exemplary modification that may be made to the presently disclosed piston assembly 210, according to one or more embodiments. Similar to FIGS. 5A-5C, FIG. 6 depicts a portion of the housing 202 and the piston bore 208 for the safety valve 112 (FIGS. 2A-2B). As illustrated, the piston bore 208 may be divided such that an additional piston (besides the upper and lower pistons 302a,b described) may be accommodated within the piston bore 208, and thereby affect the opening and closing pressures of the safety valve 112 (FIG. 2A-2B) at different points. More specifically, the piston bore 208 may be divided into the upper bore 314a, the intermediate bore 314c, and the lower bore 314b, as generally described above, but may also include a distal bore 602 and an intermediate distal bore 604 that generally interposes the lower bore 314b and the distal bore 602.

The distal bore 602 may exhibit a diameter 606 that is greater than the diameter 316b (FIGS. 3, and 4A-4B) of the lower bore 314b, and the intermediate distal bore 604 may exhibit a diameter 608 that is greater than the diameter 606 of the distal bore 602. The distal bore 602 may be configured to accommodate an additional piston (not shown) having a diameter that is substantially similar to the diameter 606 such that the additional piston provides a fluid seal against the inner walls of the distal bore 602. In some embodiments, the additional piston may include one or more dynamic seals and a labyrinth seal similar to the dynamic seals 308a-c and labyrinth seals 310a,b of FIG. 3. As a result, the additional piston may be configured to sealingly engage the inner walls of the distal bore 602 as the piston assembly 210 axially translates within the piston bore 208.

Moreover, since the additional piston exhibits a diameter greater than the second diameter 316b, it also provides an increase piston area over the piston area provided by the lower piston 302b. Accordingly, the additional piston may be configured to provide an increased hydraulic force against the power spring 234 (FIGS. 2A-2B) as it enters the distal bore 602. As a result, the embodiment allows the operator to have different force characteristics where they are needed in the stroke of the piston assembly 210, and thereby bringing the spread between the opening and closing pressures even closer together. Moreover, it will be appreciated that more than three bores may be provided in the piston assembly 210, thereby requiring a corresponding number of additional pistons, without departing from the scope of the disclosure.

As illustrated, the distal bore 602 may further exhibit a third length 610. In some embodiments, the third length 610 may be longer than one or both of the first and second lengths 502, 504. For instance, in one or more embodiments, the third length 610 may be longer than both of the first and second lengths 502, 504. In other embodiments, however, the third length 610 may be shorter than one or both of the first and second lengths 502, 504, without departing from the scope of the disclosure. As will be appreciated, the third length 610 may be varied in conjunction with the first and second lengths 502, 504 in order to manipulate or otherwise optimize the operating pressure spread between opening and closing of the safety valve 112 (FIGS. 2A-2B). Utilizing the variable length 610 and diameter 606 of the distal bore 602 will allow the operator to more precisely tune the desired opening and closing forces.

As used herein, the term "dynamic seal" is used to indicate a seal that provides pressure isolation between members that have relative displacement therebetween, for example, a seal which seals against a displacing surface, or a seal carried on one member and sealing against the other member, etc. A dynamic seal may comprise a material selected from the following: elastomeric materials, non-elastomeric materials, metals, composites, rubbers, ceramics, derivatives thereof, and any combination thereof. A dynamic seal may be attached to each of the relatively displacing members, such as a bellows or a flexible membrane. A dynamic seal may be attached to neither of the relatively displacing members, such as a floating piston.

Embodiments disclosed herein include:

A. A safety valve that includes a housing having a piston bore defined therein and configured to receive hydraulic fluid pressure, the piston bore providing an upper bore having a first diameter, a lower bore having a second diameter, and an intermediate bore interposing the upper and lower bores and having a third diameter, wherein the third diameter is greater than the second diameter and the second diameter is greater than the first diameter, and a piston assembly movably arranged within the piston bore and comprising an upper piston operatively coupled to and axially offset from a lower piston, wherein the upper piston is configured to sealingly engage the upper bore and the lower piston is configured to sealingly engage the lower bore, wherein, when the upper piston is arranged in the intermediate bore, the hydraulic fluid pressure acts on the lower piston.

B. A method of actuating a safety valve that includes conveying hydraulic fluid pressure to a piston bore that provides an upper bore having a first diameter, a lower bore having a second diameter, and an intermediate bore interposing the upper and lower bores and having a third diameter, wherein the third diameter is greater than the second diameter and the second diameter is greater than the first diameter, axially displacing a piston assembly movably arranged within the piston bore as the hydraulic fluid pressure acts on an upper piston of the piston assembly that sealingly engages the upper bore, and axially displacing the piston assembly further within the piston bore as the upper piston enters the intermediate bore and the hydraulic fluid pressure acts on a lower piston of the piston assembly that sealingly engages the lower bore, wherein the upper piston is coupled to the lower piston.

Each of embodiments A and B may have one or more of the following additional elements in any combination: Element 1: wherein the upper piston comprises a body having a piston head, at least one dynamic seal arranged about the body and configured to seal against an inner wall of the upper bore, and a first labyrinth seal interposing the piston head and the at least one dynamic seal. Element 2: wherein the lower piston comprises a body, a dynamic seal arranged about the body and configured to seal against an inner wall of the lower bore, and a labyrinth seal arranged about the body. Element 3: further comprising a piston rod that extends longitudinally from the piston assembly through at least a portion of the piston bore, a flow tube operably coupled to the piston rod and movably arranged within a flow passage defined in the safety valve in response to the movement of the piston assembly, and a valve closure device movable between an open position and a closed position and adapted to restrict fluid flow through the flow passage when in the closed position, wherein the flow tube is adapted to shift the valve closure device between open and closed positions. Element 4: further comprising a power spring arranged within a lower chamber defined within the housing and configured to bias the piston assembly upwardly within the piston bore. Element 5: further comprising a spacer member arranged between the upper and lower pistons and operably coupling the upper and lower pistons. Element 6: wherein the upper bore exhibits a first length and the lower bore exhibits a second length greater than the first length. Element 7: wherein the upper bore exhibits a first length and the lower bore exhibits a second length less than the first length. Element 8: further comprising a distal bore and an intermediate distal bore provided in the piston bore, wherein the intermediate distal bore interposes the lower bore and the distal bore and the distal bore has a fourth diameter greater than the second diameter, and an additional piston operably coupled to the lower piston and forming part of the piston assembly, the additional piston being configured to sealingly engage an inner wall of the distal bore, wherein, when the lower piston is arranged in the intermediate distal bore, the hydraulic fluid pressure acts on the additional piston.

Element 9: wherein conveying the hydraulic fluid pressure to the piston bore comprises conveying hydraulic fluid to the piston bore via a control line. Element 10: wherein the upper piston comprises a first dynamic seal and a first labyrinth seal, the method further comprising sealingly engaging an inner wall of the upper bore with the first dynamic seal, and axially displacing the piston assembly with the first labyrinth seal as the first dynamic seal exits the upper bore into the intermediate bore. Element 11: wherein the lower piston comprises a second dynamic seal and a second labyrinth seal, the method further comprising conveying the hydraulic fluid pressure past the upper piston as the first dynamic seal exits the upper bore into the intermediate bore, and sealingly engaging an inner wall of the lower bore with the second dynamic seal, whereby the hydraulic fluid pressure acts on the lower piston and moves the piston assembly. Element 12: further comprising gradually transitioning the hydraulic fluid pressure from the upper piston to the lower piston with the upper labyrinth seal. Element 13: wherein the piston assembly further comprises a piston rod that extends longitudinally through at least a portion of the piston bore and is operably coupled to a flow tube movably arranged within a flow passage defined in the safety valve, the method further comprising axially displacing the flow tube as the piston assembly moves within the piston bore, and moving a valve closure device with the flow tube from a closed position, which restricts fluid flow through the flow passage, to an open position. Element 14: further comprising compressing a power spring as the piston assembly is axially displaced by the hydraulic fluid pressure. Element 15: further comprising reducing the hydraulic fluid pressure within the piston bore, biasing the piston assembly upwardly within the piston bore with the power spring arranged within the piston bore, engaging the piston assembly on an up stop arranged in the piston bore, and generating a mechanical seal between the up stop and the piston assembly. Element 16: further comprising advancing the piston assembly within the piston bore until engaging a down stop arranged in the piston bore, and generating a mechanical seal between the piston assembly and the down stop. Element 17: wherein the upper bore exhibits a first length and the lower bore exhibits a second length that is greater than or less than the first length. Element 18: wherein the piston bore further provides a distal bore and an intermediate distal bore, wherein the intermediate distal bore interposes the lower bore and the distal bore, and the distal bore has a fourth diameter greater than the second diameter, the method further comprising axially displacing the piston assembly further within the piston bore as the lower piston enters the intermediate distal bore and the hydraulic fluid pressure acts on an additional piston of the piston assembly that sealingly engages the distal bore and is operably coupled to the lower piston.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A safety valve, comprising:
   a housing having a piston bore defined therein and configured to receive hydraulic fluid pressure, the piston bore providing an upper bore having a first diameter, a lower bore having a second diameter, and an intermediate bore interposing the upper and lower bores and having a third diameter, wherein the third diameter is greater than the second diameter and the second diameter is greater than the first diameter; and
   a piston assembly movably arranged within the piston bore and comprising an upper piston operatively coupled to and axially offset from a lower piston, wherein the upper piston is configured to sealingly engage the upper bore and the lower piston is configured to sealingly engage the lower bore, wherein, when the upper piston is arranged in the intermediate bore, the hydraulic fluid pressure acts on the lower piston.

2. The safety valve of claim 1, wherein the upper piston comprises:
   a body having a piston head;
   at least one dynamic seal arranged about the body and configured to seal against an inner wall of the upper bore; and
   a first labyrinth seal interposing the piston head and the at least one dynamic seal.

3. The safety valve of claim 1, wherein the lower piston comprises:
   a body;
   a dynamic seal arranged about the body and configured to seal against an inner wall of the lower bore; and
   a labyrinth seal arranged about the body.

4. The safety valve of claim 1, further comprising:
   a piston rod that extends longitudinally from the piston assembly through at least a portion of the piston bore;
   a flow tube operably coupled to the piston rod and movably arranged within a flow passage defined in the safety valve in response to the movement of the piston assembly; and
   a valve closure device movable between an open position and a closed position and adapted to restrict fluid flow through the flow passage when in the closed position, wherein the flow tube is adapted to shift the valve closure device between open and closed positions.

5. The safety valve of claim 1, further comprising a power spring arranged within a lower chamber defined within the housing and configured to bias the piston assembly upwardly within the piston bore.

6. The safety valve of claim 1, further comprising a spacer member arranged between the upper and lower pistons and operably coupling the upper and lower pistons.

7. The safety valve of claim 1, wherein the upper bore exhibits a first length and the lower bore exhibits a second length greater than the first length.

8. The safety valve of claim 1, wherein the upper bore exhibits a first length and the lower bore exhibits a second length less than the first length.

9. The safety valve of claim 1, further comprising:
a distal bore and an intermediate distal bore provided in the piston bore, wherein the intermediate distal bore interposes the lower bore and the distal bore and the distal bore has a fourth diameter greater than the second diameter; and
an additional piston operably coupled to the lower piston and forming part of the piston assembly, the additional piston being configured to sealingly engage an inner wall of the distal bore, wherein, when the lower piston is arranged in the intermediate distal bore, the hydraulic fluid pressure acts on the additional piston.

10. A method of actuating a safety valve, comprising:
conveying hydraulic fluid pressure to a piston bore that provides an upper bore having a first diameter, a lower bore having a second diameter, and an intermediate bore interposing the upper and lower bores and having a third diameter, wherein the third diameter is greater than the second diameter and the second diameter is greater than the first diameter;
axially displacing a piston assembly movably arranged within the piston bore as the hydraulic fluid pressure acts on an upper piston of the piston assembly that sealingly engages the upper bore; and
axially displacing the piston assembly further within the piston bore as the upper piston enters the intermediate bore and the hydraulic fluid pressure acts on a lower piston of the piston assembly that sealingly engages the lower bore, wherein the upper piston is coupled to the lower piston.

11. The method of claim 10, wherein conveying the hydraulic fluid pressure to the piston bore comprises conveying hydraulic fluid to the piston bore via a control line.

12. The method of claim 10, wherein the upper piston comprises a first dynamic seal and a first labyrinth seal, the method further comprising:
sealingly engaging an inner wall of the upper bore with the first dynamic seal; and
axially displacing the piston assembly with the first labyrinth seal as the first dynamic seal exits the upper bore into the intermediate bore.

13. The method of claim 12, wherein the lower piston comprises a second dynamic seal and a second labyrinth seal, the method further comprising:
conveying the hydraulic fluid pressure past the upper piston as the first dynamic seal exits the upper bore into the intermediate bore; and
sealingly engaging an inner wall of the lower bore with the second dynamic seal, whereby the hydraulic fluid pressure acts on the lower piston and moves the piston assembly.

14. The method of claim 13, further comprising gradually transitioning the hydraulic fluid pressure from the upper piston to the lower piston with the upper labyrinth seal.

15. The method of claim 10, wherein the piston assembly further comprises a piston rod that extends longitudinally through at least a portion of the piston bore and is operably coupled to a flow tube movably arranged within a flow passage defined in the safety valve, the method further comprising:
axially displacing the flow tube as the piston assembly moves within the piston bore; and
moving a valve closure device with the flow tube from a closed position, which restricts fluid flow through the flow passage, to an open position.

16. The method of claim 10, further comprising compressing a power spring as the piston assembly is axially displaced by the hydraulic fluid pressure.

17. The method of claim 16, further comprising:
reducing the hydraulic fluid pressure within the piston bore;
biasing the piston assembly upwardly within the piston bore with the power spring arranged within the piston bore;
engaging the piston assembly on an up stop arranged in the piston bore; and
generating a mechanical seal between the up stop and the piston assembly.

18. The method of claim 10, further comprising:
advancing the piston assembly within the piston bore until engaging a down stop arranged in the piston bore; and
generating a mechanical seal between the piston assembly and the down stop.

19. The method of claim 10, wherein the upper bore exhibits a first length and the lower bore exhibits a second length that is greater than or less than the first length.

20. The method of claim 10, wherein the piston bore further provides a distal bore and an intermediate distal bore, wherein the intermediate distal bore interposes the lower bore and the distal bore, and the distal bore has a fourth diameter greater than the second diameter, the method further comprising:
axially displacing the piston assembly further within the piston bore as the lower piston enters the intermediate distal bore and the hydraulic fluid pressure acts on an additional piston of the piston assembly that sealingly engages the distal bore and is operably coupled to the lower piston.

* * * * *